United States Patent [19]

La Iacona

[11] 3,894,677
[45] July 15, 1975

[54] METHOD OF PREPARING GRAPHITE REINFORCED ALUMINUM COMPOSITE

[75] Inventor: Felix P. La Iacona, Huntsville, Ala.

[73] Assignee: The United States of America as represented by the Administrator of the National Aeronautics and Space Administration, Washington, D.C.

[22] Filed: Mar. 24, 1971

[21] Appl. No.: 127,481

[52] U.S. Cl. .................. 228/190; 29/419; 228/193
[51] Int. Cl. ........................................... B23k 31/02
[58] Field of Search............ 29/191.2, 192 CP, 192, 29/419, 471.1, 472.3

[56] References Cited
UNITED STATES PATENTS

| | | |
|---|---|---|
| 3,371,407 | 3/1968 | Forsyth et al.................. 29/419 X |
| 3,419,952 | 1/1969 | Carlson............................. 29/419 X |
| 3,473,900 | 10/1969 | Sara................................... 29/191.2 |
| 3,551,996 | 1/1971 | Sumner et al.................. 29/419 U X |
| 3,553,820 | 1/1971 | Sara......................................... 29/419 |
| 3,609,855 | 10/1971 | Schmidt......................... 29/419 UX |
| 3,622,283 | 11/1971 | Sara............................. 29/191.2 X |

Primary Examiner—Francis S. Husar
Assistant Examiner—Gus T. Hampilos
Attorney, Agent, or Firm—L. D. Wofford, Jr.; W. H. Riggins; John R. Manning

[57] ABSTRACT

A metallic composite is made up of an aluminum matrix and high-modulus graphite fibers coated with nickel. The composite is prepared by applying a nickel coating to graphite fiber yarn, alining the yarn between aluminum sheets in a stacked array and heating the array under pressure to obtain diffusion bonding.

1 Claim, 2 Drawing Figures

FELIX P. LAIACONA
INVENTOR

3,894,677

METHOD OF PREPARING GRAPHITE REINFORCED ALUMINUM COMPOSITE

ORIGIN OF THE INVENTION

The invention described herein was made by an employee of the United States Government and may be manufactured and used by or for the Government of the United States of America without the payment of any royalties thereon or therefor.

BACKGROUND OF THE INVENTION

This invention relates to composite materials and more particularly to fiber-reinforced aluminum composites.

Metallic composites provide a group of advanced structural materials having high modulus-to-density ratios and a capability for service over extended temperature ranges. This combination of properties is obtained by using a lightweight metal such as aluminum for the matrix and incorporating oriented reinforcing fibers or filaments of high strength, high-modulus and low density refractory material such as boron or graphite in the matrix. Boron-reinforced aluminum composites have recently become available commercially, but they are extremely expensive owing to the high cost of boron. In addition, the brittleness of boron filaments precludes forming or shaping operations after preparation.

High-strength graphite fiber is much cheaper than boron and has a greater potential for future reductions in manufacturing cost. A further advantage is that composites reinforced with graphite can be subjected to shaping or forming operations after preparation without breaking the fibers. However, the preparation of graphite-reinforced aluminum composites has been beset with difficulty. Under the conditions of temperature and pressure required for composite consolidation by diffusion bonding, untreated graphite fiber is substantially degraded upon contact with aluminum metal so that much of the fiber strength is lost. Similar deterioration occurs in vacuum infiltration processes wherein the fiber comes in contact with molten aluminum. Degradation of the graphite fibers is believed to result from high-temperature chemical reactions involving adsorbed water vapor and oxygen at the graphite surface. A composite fabrication method in which such reactions are prevented is accordingly needed.

SUMMARY OF THE INVENTION

In accordance with the present invention graphite-reinforced aluminum composite material is prepared by coating high-strength, high modulus and low density graphite fiber with nickel, alining the coated fibers between and in contact with aluminum sheets in a stacked array, and bonding the array into an integral body by application of heat and pressure. The resulting diffusion-bonded composite shows favorable mechanical properties, the graphite fibers remaining intact during the preparation process. Damaging reactions at the graphite surface are prevented by the protective nickel coating. Unlike boron-reinforced composites, the graphite-reinforced material prepared by the method of this invention can be subjected to shaping or forming operations without breaking the fibers.

It is therefore an object of this invention to provide graphite-reinforced aluminum composite material.

Another object is to provide a method of preparing graphite reinforced aluminum composites.

Still another object is to provide a method of preparing such composites wherein degradation of graphite fibers is prevented.

Other objects and advantages of the invention will be apparent from the following description and the appended claims.

DESCRIPTION OF THE PREFERRED EMBODIMENT

The high-strength graphite fiber component of the reinforced composite is preferably in the form of a loosely wound yarn made up of a large number of very thin individual fiber strands. A suitable material, available commercially from Union Carbide Corporation under the trade name "Thornel 50", has 840 individual fibers, each about 6.6 microns in diameter, in a loosely wound yarn. This material has a tensile strength of 260,000 psi and a modulus value of 50,000,000 psi. Another material which can be used is the yarn newly available from the same company under the designation Thornel 75, latter yarn having a modulus of 75,000,000 psi, a tensile strength of 365,000 psi and a similar fiber structure. Any graphite fiber can be incorporated into an aluminum composite by the method of this invention, but in order to impart significant improved properties to the composite, the fiber must have a relatively high strength as reflected by a modulus of over 40,000,000 psi and a tensile strength of over 250,000 psi. High strength graphite fibers are normally prepared by graphitizing rayon fibers while under high tension.

The aluminum sheet material can be pure aluminum or any aluminum base alloy. However, maximum composite strength is obtained by using a high-strength aluminum alloy such as those available under the designation "6061" (composition, in weight percent: Cu,0.25; Si,0.6; Mg,1.0; Cr, 0.25 and the balance Al) or "2024" (Cu,4.5; Mn,0.6; Mg,1.5; and the balance Al). Relatively pure aluminum alloys such as "1100" series alloys can be employed to form a diffusion-bonded composite but overall composite properties are less favorable. Some types of aluminum alloys for example, No. 13 (12 percent Si) and No. 43 (4-6 percent Si), which have relatively high silicon content, present a problem in that the silicon tends to segregate during diffusion bonding resulting in a decrease in composite strength. The aluminum is employed in the form of thin sheet or foil material with the minimum thickness, normally 1½ to 2 mils, which allows for handling in forming a stacked array being preferred. The use of thicker sheets results in a decrease in the amount of graphite fiber that can be incorporated in the composite.

Figure 1:
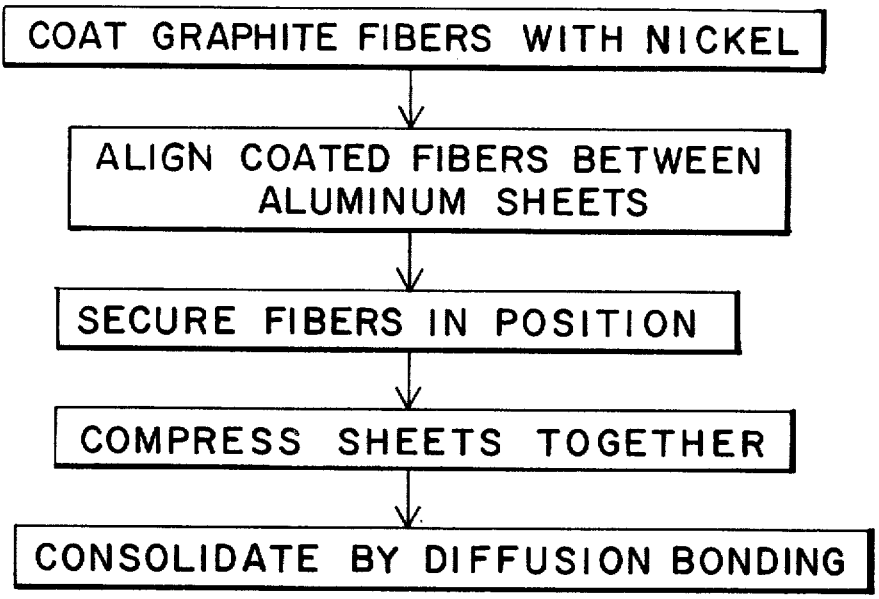
FIG. 1 is a flowsheet showing the steps involved in preparing composite material by the method of this invention and FIG. 2 is an isometric representation of a bonded graphite-reinforced composite body embodying the invention.

As indicated in FIG. 1 of the drawing, the graphite fiber is first coated with nickel. The nickel coating serves as a protective barrier for graphite during diffusion bonding. A coating of the minimum possible thickness is preferred in order to avoid increasing the desntity of the composite, nickel being substantially heavier than aluminum. Best results are obtained by applying the nickel by means of deposition from an electroless nickel bath. Conventional electroless plating baths can be used, for example, a bath containing nickelous chloride, sodium citrate, ammonium chloride and sodium hypophosphite. Contact of the fiber with such a bath for a period of 5 minutes provides complete coverage of all strands with a coating layer about 0.5 to 0.75 microns thick.

The coated fiber is then laid up between aluminum sheets to form a stacked array of alternating layers of graphite fiber and aluminum. The fibers are placed in parallel alinement on an aluminum base sheet, and some attachment or tensioning means is preferably used to maintain the fibers in place. A light coat of liquid acrylic resin applied by spraying can be used for this purpose. For preparation of large quantities of composite the fiber may be wound on a metal drum to obtain the desired fiber density, after which the arylic resin is applied. An aluminum sheet is then placed on the alined fibers and the above procedure is repeated until the desired thickness is attained. In a preferred procedure the assembly is made up three or four layers thick and bonded. If additional thickness is desired the resulting composite sheets are stacked and bonded together. The reinforcing effect of the graphite can be enhanced by alining alternating graphite fiber layers in a transverse direction.

The relative amount of graphite fiber in the composite can be controlled by the amount of fiber placed between sheets. A high proportion of fibers, up to fifty volume percent or more, is preferred for maximum strength in the composite. However, above some maximum amount, which varies with the particular fiber and aluminum sheet and with the means employed for maintaining the fibers in position, incomplete diffusion of the aluminum matrix around the fibers will result. In general about 10 to 50 volume percent of graphite fibers can be used. Lower amounts do not produce significant improvements over the properties of unreinforced aluminum.

The stacked array is consolidated by means of diffusion bonding under the combined effects of temperature, pressure and time. The outer sheets are compressed together in a suitable bonding press, preferably at a pressure of about 5,000 to 8,000 psi. The compressed array is heated to an elevated temperature below the melting point of the aluminum component for bonding, a temperature of 980°F to 1030°F giving best results. Under the preferred temperature and pressure conditions complete bonding will normally occur within about one-half hour. Lower pressures and temperatures will necessitate a longer period for bonding. No evacuation or atmosphere control during bonding is needed in this method. Although the invention is not so limited, the acrylic adhesive used to maintain the fibers in place as discussed above is believed to produce a beneficial effect during bonding in that its evolution in the form of a vapor tends to form a barrier to oxygen and other gases which react with the graphite and aluminum matrix at the diffusion bonding temperature, retarding consolidation.

Bonded graphite-reinforced composites prepared by this method exhibit enhanced strength and inasmuch as the graphite fibers are not brittle, further forming or shaping operations can be performed by means of conventional techniques. Composites embodying the invention can be used for general structural applications, and their lightweight, high strength, and high modulus render them particularly advantageous for use in aircraft and space vehicle structures.

Figure 2:
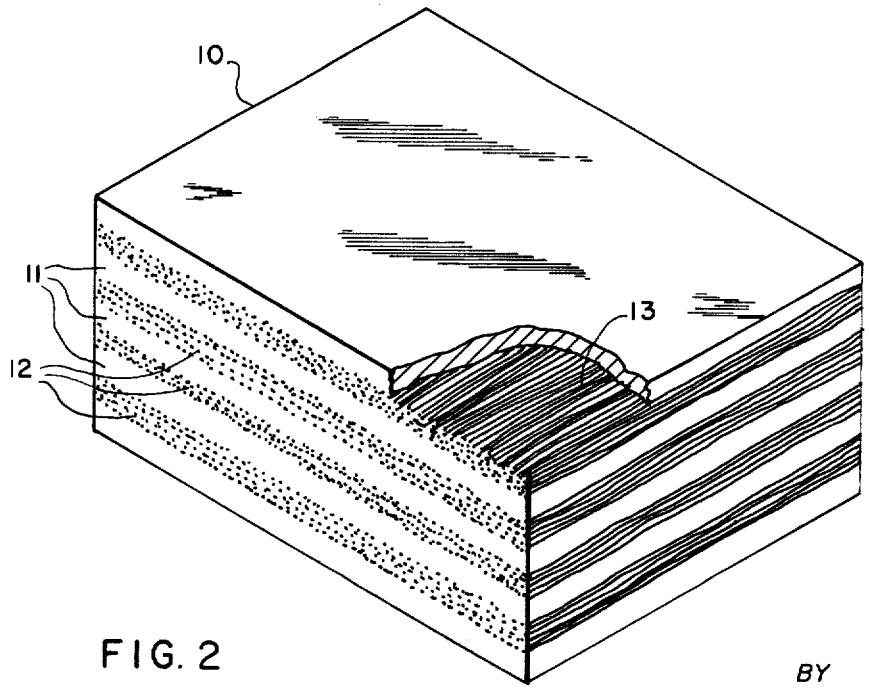

FIG. 2 shows a composite body 10 prepared in accordance with the invention. The body 10 includes layers of aluminum 11 and layers of nickel-coated graphite yarn 12, with the aluminum being completely diffused around the graphite fibers in the yarn. The yarn threads 13 are disposed in substantially parallel alinement throughout the yarn layers.

The invention is further illustrated by the following specific example.

EXAMPLE

Composite samples were prepared by the following procedure:

Graphite fiber yarn (Thornel 50) was coated with nickel to a thickness of approximately 0.5 to 0.7 microns by deposition from an electroless plating bath. The coated yarn was alined between sheets of aluminum foil (6061 or 1100 aluminum) and secured by application of acrylic resin to form a laminate containing four layers of graphite yarn. The laminate was placed in a bonding fixture, and the fixture was inserted in a bonding press between resistance heating platens. After placement of insulation around the fixture and heating platens, the temperature was increased to 980°–1030°F at a rate of 30°F per minute, and a pressure of 5,000 to 8,000 psi was applied. The assembly was held at temperature and pressure for one-half hour. No atmospheric controls were used. The resulting consolidated composite samples were removed and tested to determine tensile strength and modulus properties. Graphite-reinforced 1100 aluminum composite, which containing approximately 10 volume percent graphite showed average tensile strength values of 20,000 psi and an elastic modulus of 12,000,000 psi. Graphite-6061 composites, which also contained approximately 10 volume percent graphite, showed average tensile strength values of 19,000 psi and an elastic modulus of 12,000,000 psi. Enlarged photomicrograph examination of the composites revealed complete diffusion of the aluminum around the coated fibers and a lack of deterioration of fibers.

It is to be understood that the above example is merely illustrative and that various changes and modifications in the materials and procedures described above can be employed without departing from the spirit and scope of the invention.

What is claimed is:

1. The method of preparing a graphite-reinforced aluminum composite material which comprises applying a nickel coating to high strength graphite fiber yarn, disposing said yarn in parallel alinement between sheets of aluminum matrix material and securing said yarn in position, compressing said sheets together and heating the resulting compressed assembly at an elevated temperature below the melting point of the matrix material until said assembly is consolidated by diffusion bonding, said assembly comprising a stack of alternating layers of aluminum sheets and graphite yarn with 3 to 4 layers of graphite yarn in the stack.

* * * * *